April 30, 1968
M. L. HOCH
3,380,501
FORAGE HARVESTER HAVING CUTTER HEAD
WITH OFFSET CUTTING EDGES
Filed Oct. 22, 1965
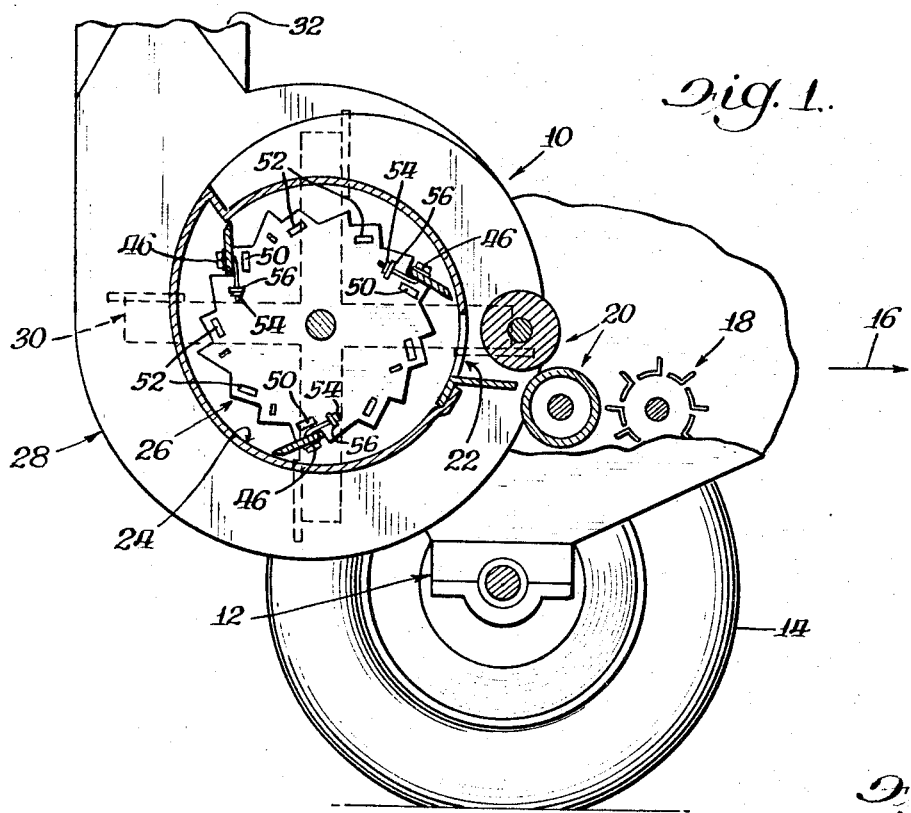
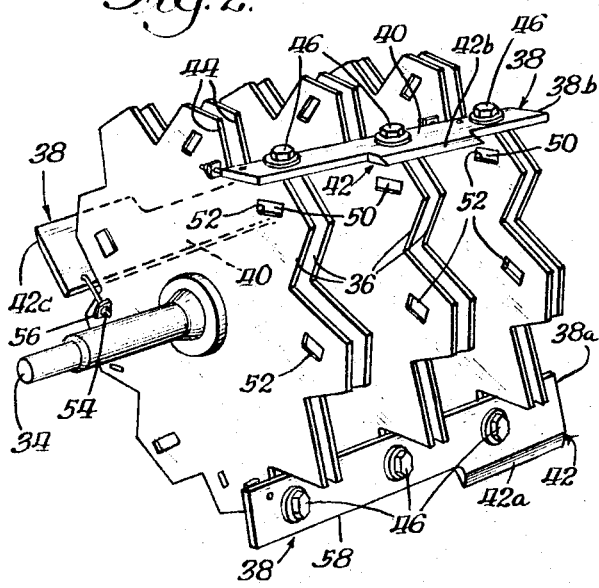
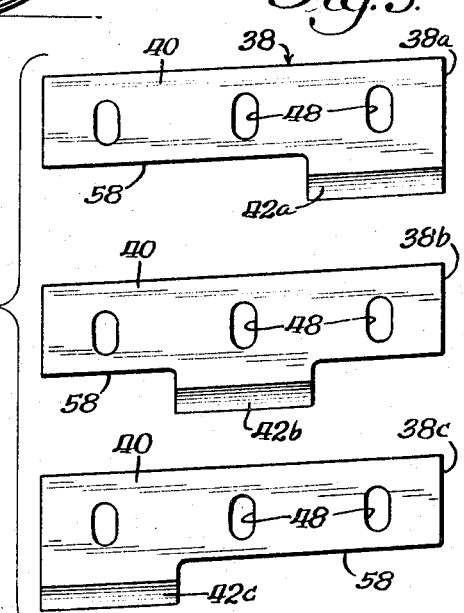
Inventor:
Manfried L. Hoch
John J. Kowalik
Atty.

United States Patent Office

3,380,501
Patented Apr. 30, 1968

3,380,501
FORAGE HARVESTER HAVING CUTTER HEAD WITH OFFSET CUTTING EDGES
Manfried L. Hoch, Lockport, Ill., assignor to International Harvester Company, Chicago, Ill., a corporation of Delaware
Filed Oct. 22, 1965, Ser. No. 501,998
3 Claims. (Cl. 146—107)

ABSTRACT OF THE DISCLOSURE

A cutter comprising a support and a plurality of combined knife and fan members wherein the members extend substantially the full length of the cutter and each having a projection extending thereahead and serving as a cutting portion, and the cutting portions of each member being offset axially entirely from each of the other cutting portions.

---

The present invention relates to a forage harvester and more specifically to a forage cutter and method of cutting.

A forage harvester of the general kind to which the present invention is adapted, is utilized for cutting hay, grasses, and other forage standing in the field and cutting the plant stalks into shorter lengths, having a cutter head with knives for the latter purpose. It is often desired to vary the lengths into which the forage is cut, for different purposes, or on different occasions, and this is done by varying the speed of the conveyor which conveys the forage to the cutter head, or to vary the speed of rotation of the cutter head, or thirdly to vary the number of knives in the cutter head, or by changing two or all three of these variables.

A principal object of the present invention is to provide a cutter head in which the effective number of knives is variable to a degree beyond that heretofore possible, while maintaining proper balance of the cutter head.

In forage cutters of this general type the cutter head is provided with a plurality of knives, such for example as nine as a maximum number. To increase the lengths into which the plants are cut, some of the knives may be removed, reducing the number of knives utilized so that fewer cuttings are made in a single revolution of the cutter head. To produce the maximum length to which the forage can be cut, in any given setting of the other variables of the apparatus, is to utilize a single knife. However a single full knife creates an unbalanced condition as will be understood. In practice dummy balance bars have been substituted for the knives. These have interferred with the cutting ability of the cutter and with the conveying and impelling function thereof.

A more specific object of the invention is to provide a cutting head, in which the cutter head can be provided with what is equivalent to a single knife, but which is fully balanced with respect to its cutting effect and which obviates the foregoing problems.

A still more specific object is to provide a cutter head of the character just referred to having a plurality of knives distributed therearound in uniformly spaced arrangement, and wherein each of the knives is provided with a cutting edge less than the full length thereof, and in which all of the cutting edges on all of the knives are substantially equivalent to and distributed along the operative axial length of the cutter head and in which the non-cutting portions of the knives serve as impellers, for impelling the cut pieces of the plant stalks to substantially the same extent as was done by cutters of the kinds heretofore known.

Another object is to provide a cutter head of the character just referred to in which the knife members, notwithstanding the relatively short cutting edges thereon, extend the full length of the cutter head and provide nearly equal strength and solidity of the cutter head that is achieved in cutter heads of the kinds heretofore known, as well as being capable of discharging the cut forage to an extent substantially equivalent to that that could be achieved heretofore.

A further object is to provide in a forage harvester of the foregoing general character, a method of varying the lengths to which the forage is cut therein.

Other objects and advantages of the invention will appear from the following detail description taken in conjunction with the accompanying drawings wherein:

FIGURE 1 is a fore-and-aft vertical sectional view through a forage harvester embodying the features of the present invention;

FIGURE 2 is a perspective view of the cutter head of the invention; and

FIGURE 3 is a face view of the knife members utilized in the cutter head.

Referring now in detail to the drawings, attention is directed first to FIGURE 1 showing a portion of the harvester as a whole, in which the cutter head of the invention is incorporated. The harvester includes a housing 10 and a frame 12 provided with wheels 14 and travels in the direction indicated by the arrow 16 in the harvesting operation. The harvester is provided with cutting means (not shown) which cuts the standing crop and the plants thus cut are then delivered onto conveyor means, most of which is not shown but represented by a single rotary member 18. The crop is then delivered to metering rolls 20 which feed the cut plants or stalks through an entry opening 22 into a chamber 24 in the housing 10. Rotatably mounted in the chamber 24 is a cutter head 26 embodying novel features of the invention. This cutter head cuts the plants or stalks into the desired lengths, as stated generally above, and it provides an impelling action on the cut pieces thereof either directly into a receptacle in a manner heretofore known, but not represented here, or into a blower chamber 28 in which a blower 30 is operatively mounted. The blower delivers the cut pieces through an exit opening 32 and they are then conveyed to a receptacle.

The arrangement of the cutter head 26 and blower 30 is disclosed and claimed in my copending application Ser. No. 484,830 filed Sept. 3, 1965, and hence need not be described in detail herein. The present invention has to do with the harvester in relation to the specific form of cutter head 26 as described in detail hereinbelow.

Attention is directed to FIGURES 2 and 3 showing the specific construction of the cutter head. The cutter head includes a central shaft 34 on which are secured a plurality of plates 36 arranged in three pairs, the pairs being spaced along the shaft. Secured to the plates are a plurality of knives or knife members 38 individually identified as 38a, 38b, and 38c. Each knife includes a body portion 40, identical in the three knives, and a cutting edge or knife edge 42, individually identified as 42a, 42b, and 42c. The cutting edges 42 extend from one end or lateral edge of the body members and each is in the neighborhood of ⅓ of the length of the body member, the three cutting edges being relatively offset or staggered longitudinally along the respective body members. Each cutting edge is of a length substantially equivalent to that fraction of the whole length of the knife member according to the number of knives, or according to the formula $$\frac{N-1}{N}$$

which describes that portion of the edge removed and $1/N$ represents the portion of the edge remaining, where N equals the number of knives. Thus in the case of three knives each cutting edge is substantially one-third the length of the knife. In consideration of practical circumstances it may be desired to have each slightly longer than the amount indicated so that there is a slight overlap as between the cutting edges on successive knives.

The knives or knife members are mounted in the cutter head by securing them to the plates 36, in a known manner, the plates having notches 44 receiving them. The plates themselves may be of any suitable kind. The body portion 40 of each knife is presented to one edge of the notch and the knife is secured rigidly in place by bolts 46 inserted through apertures 48 which are preferably elongated in tangential direction, the bolts extending between the two plates 36 of the respective pairs, and threaded into nut elements 50 received in apertures 52 in the plates. Means is provided for adjustably setting the knives which may include bolts 54 mounted in brackets 56 secured to the plates 36, provided with nuts working against the brackets, and connected with the knives as at 57 adjacent their inner edges. After the knives are adjusted according to the settings of the bolts 54, the bolts 46 are tightened to secure the knives in adjusted position.

The cutter head is mounted in the housing in any suitable manner, the shaft 34 being supported in bearings at the sides of the housing. The shaft is extended through the blower chamber 28 and supports the blower 30 also, and a suitable pulley secured to the shaft 34 for driving the cutter head and blower from a suitable source such as the power take-off of the tractor drawing the harvester.

The knives 38 as viewed from the end may assume a shape similar to knives heretofore known, the difference between the present knives and those heretofore known being the cut-away portions indicated by the lines 58, the cutting edges thus projecting laterally of the body members beyond those lines. The cut-away portions are of suitable depth such for example that the lines 58 may be in the neighborhood of the periphery of the plates 36.

As in the use of cutter heads heretofore known, as the cut crop plants are delivered by the metering rolls 20 through the opening 22 into the cutter head, the cutter head in rotating cuts them into shorter lengths as referred to above. The cutaway portions as indicated by the lines 58 are of such depth that the stalks of the crop in register therewith feed into the cutter head and may feed a distance greater than that corresponding to the depth of the cut-away portion, which of course is substantially greater than the length of those stalks leading to the cutting edge 42. However, the material will be simply impacted by the dull edge, not severed. The effect of removing the cutting area is primarily that of impairing the cutting action, rather than completely avoiding any contact with the incoming crop. Each of the cutting edges 42 performs one cutting operation in each full rotation of the cutter head with the aggregate effect, insofar as the length of the crop stalks is concerned, similar to that provided by a single knife having a cutting edge extending the full axial length of the cutter head. In the latter case however the cutter head would be severely unbalanced, because that knife would receive a single, massive impact load as the knife contacts the mass of plant stalks. Heretofore it has been attempted to provide a single full length knife, but to counter balance it with weight means. Such an arrangement has not proved entirely satisfactory, a principal reason being that as the single knife became dull and worn down and less massive, the single counter balance weight ceased to provide the counter balancing effect it previously did, and another reason being that the amount of stalks engaged each time by the knife often varied in size and mass beyond the range of effectiveness of the counter balance weight. However in the present instance, the dulling effect is substantially uniform on all of the knife members, and the balance is not impaired. Additionally, the shorter interval between cutting action by successive knives distributes the tendency to imbalance around the cutter head, so that imbalance caused in connection with one knife member is quickly partially counteracted by a similar imbalance in connection with the next knife member, at less than a full revolution.

Another advantage of the present construction is that the knives 38, being secured to all of the plates 36 throughout their effective length, provide the desired structural strength of the cutter head, in contrast to the arrangement in which a single knife is utilized. The body portions 40 of the knives are of sufficient size and strength to provide that structural strength.

An additional advantage of the present construction is that the delivery characteristics of the cutter head are nearly as great as in those cutter heads in which the knives are of full dimensions. As is known, in the operation of forage harvesters of this general kind, the knives in addition to cutting the crop stalks into the desired length, produce a delivering or impelling force on the cut lengths, and deliver them either to a blower as in the present arrangement or to the receptacle, in a known manner. After the initial cutting step by the knives, and in continuation of the rotation of the cutter head, those cut lengths are thrown outwardly by the knives after the knives progress beyond the entry opening 22. The body portions 40 of the knives produce a delivering or impelling effect on the cut lengths notwithstanding the cutaway portions, substantially equivalent to that produced by knives having cutting edges extending their full length.

Since the knife members in the present instance are identical to knife members heretofore known, except for the cut-way portions, substantial economy is realized in the elimination of necessity for elaborate redesigning.

It will be understood that the number of knives utilized in the present arrangement may be any number other than three, within a practical range, such for example as two, or four, etc., and in each case the length of the cutting edges on the knives would follow the formula stated above, i.e., in the case of two knives each cutting edge would be substantially one-half the length of the knife; in the case of four knives, each cutting edge would be substantially one-fourth the full length of the knives, etc. Cutter heads as heretofore known quite often included nine knives, and the body of that same cutter head may be utilized in the present instance, and hence three knives have been found the best number. If desired, the plates 36 may be designed specially for the smaller number of knives and in such case, and in the case of three knives as in the present instance, the plates would have three notches therein. However it may be desired to alter the number of knives as between three and more than three, in the same cutter head and in that case the plates 36 may be provided with a greater number of notches, such as nine, so that the number of knives may be altered for the specific circumstances encountered whereby the same cutter head, except for the number of knives, can be utilized in any of the various circumstances.

While I have disclosed herein a certain preferred form of the invention, it will be understood that changes may be made therein within the scope of the appended claims.

I claim:

1. A cutter of the character disclosed comprising a housing having an entry opening and an exit opening, means for feeding forage through the entry opening into the housing, a rotatable cutter head in the housing for cutting forage fed through said entry opening, the cutter head including elongated members extending from one end of the cutter head to the other and each having a base portion serving as fan means, and each member having a single portion less than the length of said member serving as knife means and projecting forwardly of the base portion, and said single portions of said members being offset axially relative to each other.

2. A cutter of the character disclosed comprising a housing having an entry opening and an exit opening, means for feeding forage through the entry opening into the housing, a rotatable cutter head in the housing for cutting forage fed through said entry opening, the cutter head including a central shaft, a plurality of transversely arranged plates secured to the shaft in axially spaced relation thereon, a plurality of members extending in length substantially the full axial length of the cutter head and distributed circumferentially therearound and secured to all said plates, each member having a cutting portion less than its length and being wider circumferentially of the cutter head at said cutting portion than elsewhere, the cutting portions of all of said members together extending substantially the entire axial length of the cutter head, and said members serving as means for delivering cut forage from the housing through the exit opening, each cutting portion being offset axially of the cutter head from every other cutting portion.

3. A forage cutter assembly comprising a support, a plurality of combined knife-fan members each having a body and all of substantially the same length, and each having a cutting portion at one edge of the body extending less than the full length of the body and projecting from the body in an intended cutting direction, and the cutting portions being respectively at different positions along the length of the bodies in circumferentially non-overlapping relationship to each other and collectively extending substantially the full length of the cutter assembly.

References Cited

UNITED STATES PATENTS

| | | | |
|---|---|---|---|
| 810,204 | 1/1906 | Harrison et al. | 146—120 |
| 914,136 | 3/1909 | Gibbons | 146—121 |
| 1,797,463 | 3/1931 | Cederholm. | |

W. GRAYDON ABERCROMBIE, *Primary Examiner.*